(12) United States Patent
Ahner et al.

(10) Patent No.: US 7,226,068 B2
(45) Date of Patent: Jun. 5, 2007

(54) METHOD AND DEVICE FOR DETECTING AND STABILIZING A FISHTAILING TRAILER USING WHEEL FORCES

(75) Inventors: Peter Ahner, Boeblingen (DE); Joachim Schadow, Dettenhausen (DE); Peter Zegelaar, Heerlen (NL)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 11/029,241

(22) Filed: Jan. 3, 2005

(65) Prior Publication Data

US 2005/0161901 A1    Jul. 28, 2005

(30) Foreign Application Priority Data

Jan. 28, 2004   (DE) .................. 10 2004 004 151

(51) Int. Cl.
*B60T 7/12*   (2006.01)
*B62D 53/00*   (2006.01)

(52) U.S. Cl. ........................ 280/432; 701/80
(58) Field of Classification Search ............ 280/455.1, 280/474, 492, 490, 432; 701/80
See application file for complete search history.

(56) References Cited

U.S. PATENT DOCUMENTS

| | | | | |
|---|---|---|---|---|
| 4,023,864 A | * | 5/1977 | Lang et al. .................. 303/20 |
| 4,494,765 A | * | 1/1985 | Ratsko et al. ............... 280/432 |
| 4,583,756 A | * | 4/1986 | Hornung et al. ............ 280/432 |
| 5,152,544 A | * | 10/1992 | Dierker et al. .............. 280/432 |
| 5,411,322 A | * | 5/1995 | Breen ............................. 303/7 |
| 7,005,987 B2 | * | 2/2006 | Sinnett et al. ........... 340/572.1 |
| 7,034,711 B2 | * | 4/2006 | Sakatani et al. ......... 340/686.1 |

FOREIGN PATENT DOCUMENTS

| | | |
|---|---|---|
| DE | 199 64 048 | 1/2001 |
| DE | 100 41 093 | 3/2002 |

* cited by examiner

*Primary Examiner*—Lesley D. Morris
*Assistant Examiner*—Marc A. Scharich
(74) *Attorney, Agent, or Firm*—Kenyon & Kenyon LLP

(57) ABSTRACT

A method and device for detecting and stabilizing a fishtailing trailer using wheel forces. In particular, a method for stabilizing a vehicle combination made up of a towing vehicle and a trailer in which lateral forces acting on at least one wheel or at least one tire are ascertained with the aid of a sensory system that detects wheel forces or tire forces, the existence of a fishtailing movement of the trailer is detected from the ascertained lateral forces and, in the event of a detected fishtailing movement of the trailer, a braking intervention and/or steering intervention is performed.

10 Claims, 1 Drawing Sheet

METHOD AND DEVICE FOR DETECTING AND STABILIZING A FISHTAILING TRAILER USING WHEEL FORCES

FIELD OF THE INVENTION

The present invention relates to a method and device for detecting and stabilizing a fishtailing trailer using wheel forces.

BACKGROUND INFORMATION

When a vehicle combination becomes unstable, this becomes noticeable in that the trailer is fishtailing. In this case, the trailer periodically transmits alternating forces via the trailer hitch onto the towing vehicle. These alternating forces lie essentially in the direction of the roadway perpendicular to the plane of travel. The frequencies of such trailer movements lie approximately between 0.5 Hz and 1.5 Hz.

German patent document no. 199 64 048 discusses a method and a device for stabilizing a road vehicle, in particular a passenger car having a trailer towed by the road vehicle. In this instance, the road vehicle is monitored with respect to fishtailing movements. When a fishtailing movement is detected, a yaw moment is automatically applied on the road vehicle, which is essentially in phase opposition to the fishtailing movement.

German patent document no. 100 41 093 discusses a sensor system and evaluation methods, which are suitable in a roller bearing for detecting physical quantities, particularly for detecting and evaluating quantities that are a function of rotational speed during the movement of the components supported in the roller bearing. The expansion forces caused by roller elements of the roller bearing and acting on the fixed bearing shell of the roller bearing are detected using expansion-sensitive sensors in that two sensors are attached on the bearing shell such that they are in each case offset with respect to each other by half of the angular distance of the roller elements in the direction of rotation. This invention is suitable for example for detecting braking, acceleration, lateral and vertical forces.

SUMMARY OF THE INVENTION

The exemplary embodiments and/or exemplary methods of the present invention relates to a method for stabilizing a vehicle combination made up of a towing vehicle and a trailer in which lateral forces acting on at least one wheel or at least one tire are ascertained with the aid of a sensory system that detects wheel forces or tire forces, the existence of a fishtailing movement of the trailer is detected from the ascertained lateral forces and, in the event of a detected fishtailing movement of the trailer, a braking intervention and/or steering intervention is performed.

An exemplary embodiment and/or exemplary method of the present invention is characterized in that periodic components of the ascertained lateral forces are ascertained, the frequencies and phase angles of the periodic components are ascertained and the existence of a fishtailing movement of the trailer is detected by evaluating the frequencies and phase angles.

This refinement is based on the fact that a fishtailing trailer results in periodic components in the lateral movement or yaw movement (and thus the lateral forces) of the vehicle.

Another exemplary embodiment and/or exemplary method of the present invention is characterized in that the wheel forces or tire forces are ascertained for at least the two wheels of an axle and that the existence of a fishtailing movement of the trailer is detected when the frequencies and phase angles of the two periodic components agree.

Another exemplary embodiment and/or exemplary method of the present invention is characterized in that the wheel forces or tire forces of all wheels of the towing vehicle are ascertained, that additionally the amplitudes of the periodic components are detected and that the existence of a fishtailing movement of the trailer is detected when the frequencies of all periodic components agree, the amplitudes and phase angles of the periodic components of the front axle wheels agree, the amplitudes and phase angles of the periodic components of the rear axle wheels agree, the amplitudes of the periodic components of the rear axle wheels are greater than the amplitudes of the periodic components of the front axle wheels and the phase angles of the periodic components of the rear axle wheels are in phase opposition to the phase angles of the periodic components of the front axle wheels.

Both of the last-described embodiments characterize specific exemplary embodiments of the present invention.

Another exemplary embodiment and/or exemplary method of the present invention is characterized in that additionally the amplitudes of the periodic components are ascertained and that in the event that a fishtailing movement exists and at least one amplitude exceeds a specified boundary value, the right and the left wheel of the axle are alternately braked.

By this alternate braking, a yaw moment can be applied to the vehicle, which counteracts the yaw moment of the trailer.

For this reason, another exemplary embodiment and/or exemplary method of the present invention is characterized in that the frequency with which the alternation between a braking of the left wheel and of the right wheel occurs agrees with the frequency of the periodic components.

Another exemplary embodiment and/or exemplary method of the present invention is characterized in that the setpoint values of the lateral forces are ascertained using a single-track model and that the periodic components are ascertained from the difference between the setpoint values of the lateral forces and the lateral forces ascertained by the sensory system detecting wheel forces or tire forces.

The setpoint values ascertained with the aid of the single-track model represent the generally non-periodic driver input and contain no periodic components resulting from the fishtailing of the trailer. This subtraction removes all significant non-periodic components (a type of offset value) from the lateral force signal and thus allows for a simpler signal processing.

The exemplary embodiment and/or exemplary method of the present invention further relates to a device for stabilizing a vehicle combination made up of a towing vehicle and a trailer including

- a sensor arrangement for ascertaining the lateral forces acting on at least one wheel or at least one tire,
- a fishtailing detection arrangement for detecting the existence of a fishtailing movement from the output signals of the sensor arrangement as well as
- at least one actuator for performing a braking intervention and/or steering intervention in the event of a detected fishtailing movement of the trailer.

Another exemplary embodiment and/or exemplary method of the present invention is characterized in that the sensor arrangement are expansion-sensitive sensors on the bearing shell of the roller bearing of the at least one wheel.

Another exemplary embodiment and/or exemplary method of the present invention is characterized in that the sensors are tire force sensors.

Of course, the advantageous refinements of the exemplary method according to the present invention manifest themselves also as advantageous refinements of the exemplary device according to the present invention, and vice versa.

DETAILED DESCRIPTION

Figure 1:
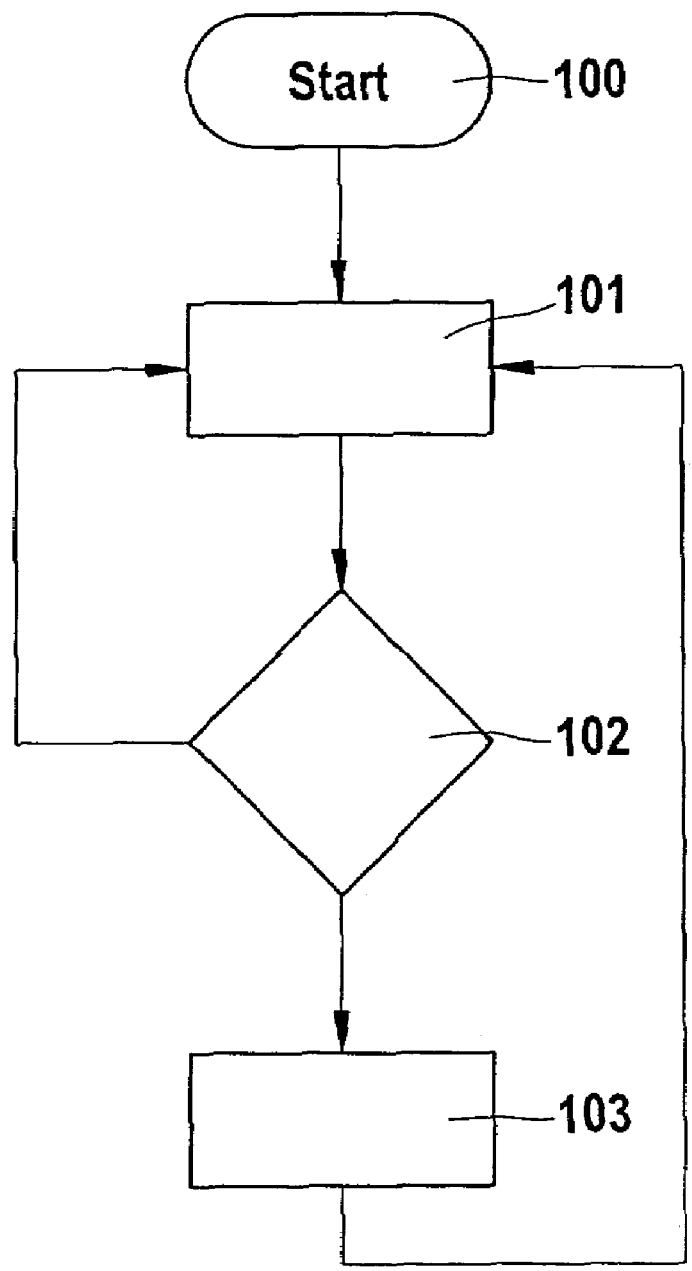
FIG. 1 shows the sequence of the exemplary method according to the present invention.

With the exemplary embodiment and/or exemplary method of the present invention, a sensory system detects if the trailer transmits periodic forces onto the towing vehicle via the trailer hitch. Following the detection of such a situation, the vehicle combination is stabilized.

The lateral force oscillations Fq_i (Fq_i designates the lateral force Fq at the $i^{th}$ wheel) of all 4 wheels of the towing vehicle is analyzed according to amplitude and phase with the aid of a sensory system that measures the wheel force. The sensory system that measures the wheel force is one that directly measures the forces acting on the wheel and that can be situated, for example, on the wheel bearing or directly on the tire.

Fishtailing of the trailer exists if the following points are simultaneously satisfied:
1. The frequencies of the individual wheel oscillations are the same,
2. the amplitude and the phase of the oscillations at both front wheels are approximately the same,
3. the amplitude and the phase of the oscillations at both rear wheels are approximately the same,
4. the amplitude of the oscillations at the rear wheels is greater than at the front wheels and
5. the oscillations at the front and rear axle are in phase opposition.

For a more robust variant of the exemplary embodiments and/or exemplary methods of the present invention, it is possible to use the single-track model to calculate first the individual lateral wheel forces Fq_single-track_i without external interferences (fishtailing of the trailer). For this purpose, the current driving condition, the operating state of the actuators (steering, drive train, brake) as well as a tire model are required. Only the difference between Fq_i and Fq_single-track_i is supplied to the analysis as such. This is especially advantageous in vehicles that have their center of gravity in the rear section of the vehicle. An imminent instability is detected if the oscillations build up or have already exceeded a boundary value. In this case, the wheels of the left and right side of the vehicle are alternately braked. Instead of braking both left or both right wheels simultaneously, it is alternatively also possible to brake only one wheel of the left or of the right side so as to stabilize the vehicle combination by the yaw moment generated in this manner (which counteracts the yaw moment of the trailer).

Alternatively, such a stabilizing yaw moment can also be applied using an active steering. This furthermore entails the advantage that the intervention thresholds can be lowered significantly since the steering intervention can occur very quickly and in a very finely dosed manner and is not noticed by the driver especially in the case of small trailer oscillations. A buildup of the trailer oscillation is thereby already suppressed at a very early stage.

The sequence of the exemplary method according to the present invention is shown in FIG. 1. Following the start in block 100, the tire or wheel forces are ascertained in block 101. In block 102, the lateral forces ascertained in block 101 are subsequently used to determine whether a fishtailing movement exists. If no fishtailing movement exists, then there is a branching back to block 101. If a fishtailing movement exists, however, then steering and/or braking interventions are subsequently performed in block 103. Optionally, there is a branching back to block 101 following block 103, and the wheel forces are ascertained anew.

What is claimed is:

1. A method for stabilizing a vehicle combination having a towing vehicle and a trailer, the method comprising:
   - ascertaining lateral forces acting on at least one wheel or at least one tire with a sensory system that detects wheel forces or tire forces;
   - detecting a fishtailing movement of the trailer from the ascertained lateral forces; and
   - performing, in the event of a detected fishtailing movement of the trailer, at least one of a braking intervention and a steering intervention.

2. The method of claim 1, wherein periodic components of the ascertained lateral forces are ascertained, frequencies and phase angles of the periodic components are ascertained, and a fishtailing movement of the trailer is detected by evaluating the frequencies and the phase angles.

3. The method of claim 2, wherein the wheel forces or tire forces are ascertained for at least two wheels of an axle, and the fishtailing movement of the trailer is detected when the frequencies and the phase angles of the two periodic components respectively agree.

4. The method of claim 2, wherein:
   - the wheel forces or tire forces of all wheels of the towing vehicle are ascertained and amplitudes of the periodic components are detected, and
   - the fishtailing movement of the trailer is detected when the frequencies of all periodic components agree, the amplitudes and the phase angles of the periodic components of front axle wheels agree, the amplitudes and the phase angles of the periodic components of rear axle wheels agree, the amplitudes of the periodic components of the rear axle wheels are greater than the amplitudes of the periodic components of the front axle wheels, and the phase angles of the periodic components of the rear axle wheels are in phase opposition to the phase angles of the periodic components of the front axle wheels.

5. The method of claim 3, wherein amplitudes of the periodic components are ascertained and, if the fishtailing movement exists and at least one amplitude exceeds a specified boundary value, a right wheel and a left wheel of the axle are alternately braked.

6. The method of claim 5, wherein the frequency with which the alternation between a braking of the left wheel and of the right wheel occurs agrees with the frequency of the periodic components.

7. The method of claim 2, wherein setpoint values of the lateral forces are ascertained using a single-track model, and the periodic components are ascertained from a difference between the setpoint values of the lateral forces and the lateral forces ascertained by the sensory system detecting wheel forces or tire forces.

8. A device for stabilizing a vehicle combination having a towing vehicle and a trailer, the device comprising:

a sensor arrangement to ascertain lateral forces acting on at least one wheel or at least one tire;
a fishtailing detection arrangement to detect a fishtailing movement of the trailer from output signals of the sensor arrangement; and
at least one actuator for performing at least one of a braking intervention and a steering intervention if the fishtailing movement of the trailer is detected.

9. The device of claim 8, wherein the sensor arrangement includes expansion-sensitive sensors on a bearing shell of a roller bearing of the at least one wheel.

10. The device of claim 9, wherein the sensors include tire force sensors.

* * * * *